United States Patent [19]

McCoy

[11] Patent Number: 4,934,186

[45] Date of Patent: Jun. 19, 1990

[54] AUTOMATIC ECHO METER

[76] Inventor: James N. McCoy, 5001 Ditto La., Wichita Falls, Tex. 76301

[21] Appl. No.: 102,347

[22] Filed: Sep. 29, 1987

[51] Int. Cl.$^5$ ............................................. E21B 47/00
[52] U.S. Cl. ...................................... 73/151; 73/290; 73/155; 367/81; 367/908
[58] Field of Search ...................... 73/151, 155, 290 V; 367/908, 100, 108, 33, 81, 98; 340/621; 364/509, 422

[56] References Cited

U.S. PATENT DOCUMENTS

| | | | |
|---|---|---|---|
| 2,156,519 | 5/1939 | Walker | 367/81 X |
| 2,232,476 | 2/1941 | Ritzmann | 367/908 X |
| 2,560,911 | 7/1951 | Wolf | 367/908 X |
| 2,998,723 | 9/1961 | Smith, Jr. et al. | 73/290 V |
| 3,022,489 | 2/1962 | Huddleston, Jr. | 367/33 |
| 3,205,477 | 9/1965 | Kalbfell | 73/151 X |
| 3,316,997 | 5/1967 | McCoy | 367/908 X |
| 3,394,589 | 7/1968 | Tomioka | 73/290 V |
| 4,170,765 | 10/1979 | Austin et al. | 73/290 V X |
| 4,318,298 | 3/1982 | Godbey et al. | 73/155 |
| 4,318,674 | 3/1982 | Godbey et al. | 417/36 |
| 4,389,164 | 6/1983 | Godbey et al. | 417/36 |
| 4,408,676 | 10/1983 | McCoy | 367/908 X |
| 4,700,569 | 10/1987 | Michalski et al. | 367/908 X |

Primary Examiner—Eugene R. Laroche
Assistant Examiner—Seung Ham
Attorney, Agent, or Firm—Richards, Harris, Medlock & Andrews

[57] ABSTRACT

An apparatus (10) is disclosed for permitting continuous calculations of the depth of the fluid level (12) within a well bore (14) during a test interval. A sonic event is generated in the well bore, and the reflected sonic signals from down hole tubing collars and the fluid surface are sensed and recorded. By knowing the depth of the tubing collars, the fluid depth and speed of sound in the oerlying gas can be computed. Subsequently, the apparatus (10) generates sonic events and records the travel time for the sound to reflect off the fluid surface and return. Measurements of the actual fluid depth and sonic velocity are made at regular intervals, and interpolated between actual measurements to allow the variation in fluid level to be calculated from the measurements of travel time.

7 Claims, 3 Drawing Sheets

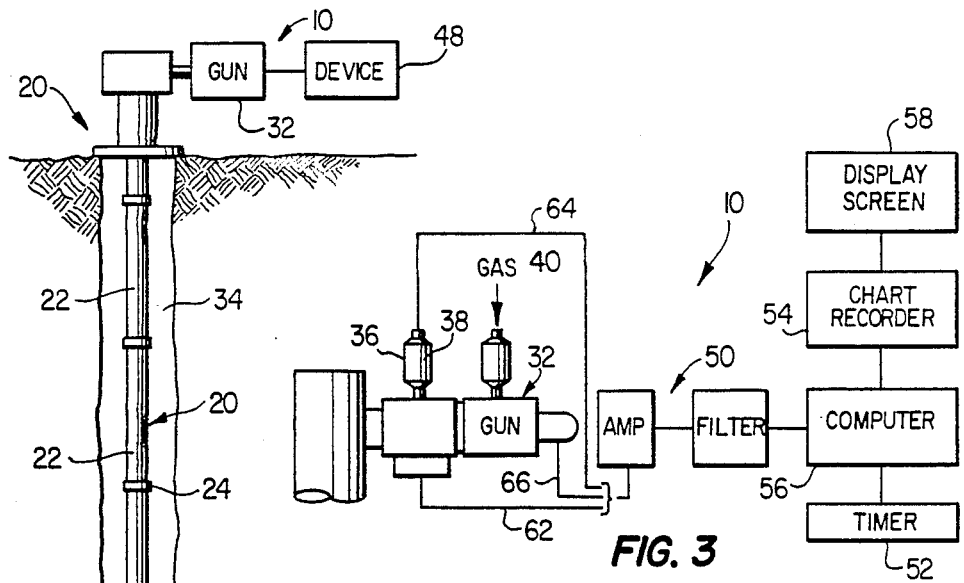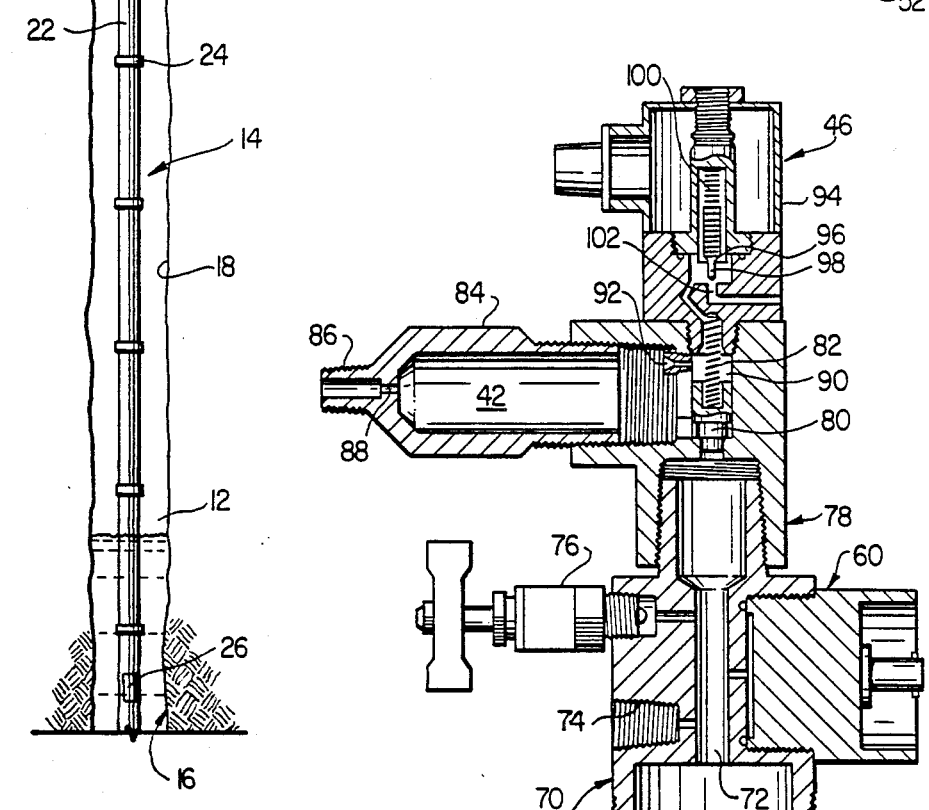

AUTOMATIC ECHO METER

TECHNICAL FIELD

This invention relates to an apparatus and method for determining bottom hole pressure over an extended period of time by acoustic techniques.

BACKGROUND OF THE INVENTION

One very important test for determining the condition of a producing oil well is a bottom hole pressure build up test. The results of this test indicate the need for well stimulation, work over, or recompletion, as well as permit the determination of formation characteristics. Occasionally, pressure sensors can be placed directly at the formation level within the borehole for direct measurement of pressure. However, more frequently, the presence of pumping rods in the tubing prevents such direct measurement. In those situations, it is common to use acoustic techniques to determine the level of the fluid within the borehole, and calculate the bottom hole pressure estimating the density and depth of the fluid column and overlying gas.

A typical pressure build up test will require three to four days to complete. Sufficient data points must be taken during this period to accurately represent the trend in pressure behavior during this period. With conventional acoustic techniques, each data point requires the involvement of personnel, thus creating a situation where such test can become prohibitively expensive.

U.S. Pat. No. 4,318,298, issued Mar. 9, 1982, U.S. Pat. No. 4,318,674, issued Mar. 9, 1982 and U.S. Pat. No. 4,389,164, issued June 21,1983 are each assigned to Mobil Oil Corporation, and disclose a technique which attempts to provide an automatic liquid level monitor and controller. This technique requires the fluid level to be pumped down to the pump inlet in the well at a known depth. A sonic level sensor is calibrated to this known depth. However, it is often impractical to pump a well to the pump inlet, and this technique does not account for variation in sonic velocity within the well after calibration.

A need exists for an improved apparatus and method for conducting acoustic pressure build up test. The cost of conducting such a test should be minimized, while the accuracy of the test is further enhanced and refined.

SUMMARY OF THE INVENTION

In accordance with one aspect of the present invention, an apparatus is provided for measuring variations of the fluid level within a well bore over a given time period. The apparatus includes structure for generating a sonic event in the well bore and structure for sensing sonic energy reflected from down hole sonic reflectors, including tubing collars and the fluid surface itself. Calibration structure is provided for activating the sonic generator and the sonic sensor at the beginning of the time period and at regular intervals thereafter during the time period for determining the fluid level by relating the sonic reflection from the fluid surface to the sonic reflection from sonic reflectors at known depths, and for calculating the sonic velocity of the overlying gas. The apparatus further includes structure for activating the sonic generator and sonic sensor at regular intervals between the activation of the calibration structure to measure the travel time for the sonic energy to travel from the source, reflect off the fluid level and return to the sonic sensor with muting of the sonic reflections of other sonic reflectors in the well bore to isolate the sonic reflection from the fluid surface.

In accordance with another aspect of the present invention, the calibration structure includes an amplifier for the signals received by the sonic sensing structure with the amplifier having automatic gain control to provide distinct separation between the sonic reflections of the various sonic reflectors within the well bore. In accordance with another aspect of the present invention, filters are employed. With the calibration structure, a sharp filter for enhancing signals above 50 Hertz is employed to detect upper collars in the well bore. A filter enhancing signal in a frequency range of 15 to 25 Hertz is used to enhance detection of deep collars within the well bore. In the travel time structure, a high pass filter can be employed where the down hole gas liberation noise is excessive. A low pass filter can be employed in a number of special conditions. One such condition is when mechanical vibrations of the wellhead are present. Another condition would be the presence of an obstruction, such as a lining top, tubing anchor, paraffin or tubing perforations above the fluid level. Low frequency sound passes around such obstructions more readily than higher frequency sound. A broad band filter can be employed if the special conditions do not exist.

In accordance with another aspect of the present invention, a method for measuring the variation of the fluid level in a well bore over a time period is provided. The method includes the step of generating a sonic event in the well bore and sensing the sonic energy reflected from down hole energy reflectors, including tubing collars and the fluid surface at the beginning of the time interval, and at regular intervals thereafter, to determine the depth of the fluid surface from the sonic energy reflected from sonic reflectors at known depths and calculating the sonic velocity of the overlying gas. The method further includes the step of generating a sonic event in the well bore and muting the sonic energy reflections from down hole energy reflectors for a mute time to isolate the sonic reflection from the fluid surface at regular intervals between the sonic events used to calculate the sonic velocity in the overlying gas.

BRIEF DESCRIPTION OF THE DRAWINGS

A more complete understanding of the invention may be had by reference to the following Detailed Description when taken in conjunction with the accompanying drawings, wherein:

FIG. 1 is a cross sectional view of a typical well bore with a fluid level within the well bore whose depth is to be determined;

FIG. 2 is a cross sectional view of a combination gas gun and microphone mounted at the well head for generating an acoustic event within the well bore and sensing the acoustic energy reflected from down hole energy reflectors, such as tubing collars and the fluid surface;

FIG. 3 is a flow chart of one apparatus constructed in accordance with the teachings of the present invention for automatically monitoring the fluid surface depth over a predetermined time period;

DETAILED DESCRIPTION

Figure 6:
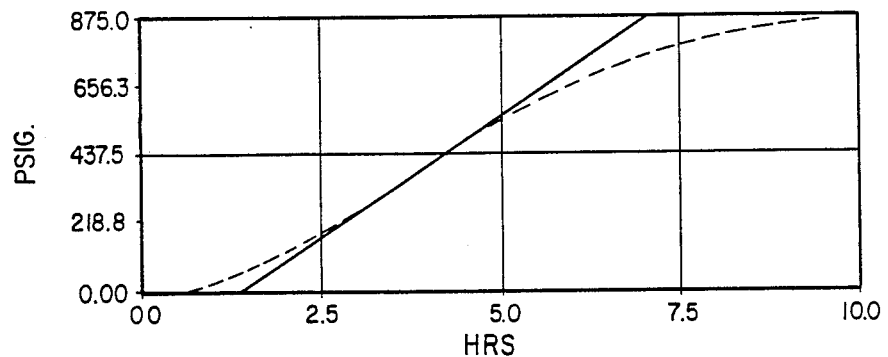
FIG. 6 is an example of a log plot of bottom hole pressures over the time interval as computed from fluid surface depths determined by the apparatus.

Referring now to the drawings, wherein like reference characters designate like or corresponding parts throughout the several views, apparatus 10 is illustrated for automatically determining the depth of the fluid surface 12 within a well bore 14 over a predetermined time interval. The apparatus 10 is capable of determining the variation of the bottom hole pressure at the oil or gas producing formation 16 as a function of time during this interval to allow plotting of conventional plots, such as seen in FIG. 6, to complete a bottom hole pressure transient test indicating the condition of the well, and the need for treatment of the well.

With reference to FIG. 1, a typical well bore can be seen to have a casing 18 which is perforated at the level of the formation 16 to allow oil and gas from the formation to flow into the interior of the casing. Tubing 20 extends within the well bore and is formed of individual tubing sections 22 secured together by threaded tubing couplings 24. Pump 26 may be present which is positioned below the fluid level 12 and operated from the surface through a rod which is reciprocated to pump the fluid to the well head 30.

As is well understood, significant diagnostic information can be provided by measuring the variation in formation pressure over a predetermined time interval with the pumping action halted. Such pressure transient analysis are typically plotted on a semi-log plot, log-log plot, Horner plot, square root plot, or a Cartesian plot for analysis. The results of that analysis can indicate formation characteristics and properties, and whether the well needs to be treated, or is producing adequately. Also, such an analysis can lead to a selection of a pump with capacity selected to match the production of the well to optimize production.

With reference to FIG. 3, the major components of the apparatus 10 will be described. A combination gun and microphone assembly 32 is mounted on the well head for communication with the annulus 34 between the casing 18 and tubing 20. The assembly 32 generates a sonic pulse which travels down the annulus and reflects off the various down hole anomalies, such as the collars 24 and the fluid surface 12. The sonic energy reflected by these anomalies travels back up the annulus and is sensed by the microphone 60 within assembly 32. A pressure transducer 36 and a thermistor 38 are mounted on assembly 32 to provide a constant measurement of the gas pressure in the assembly and the environmental temperature.

The gun within assembly 32 creates a sonic event by rapidly discharging a volume of gas at a relatively high pressure from one cavity, to a chamber at a relatively low pressure. The high pressure gas is supplied from a gas supply 40 to a volume chamber 42 within the gun. A gas valve 80, operated by solenoid 46, rapidly discharges the gas from the volume chamber into the annulus to generate the sonic event. Use of a high pressure gas supply 40 is recommended, however, when the well bore gas pressure level is high a separate gas supply is not absolutely necessary. The volume chamber can simply be opened to atmospheric pressure, and the gas valve opened to discharge a quantity of well bore gas into the volume chamber, generating the sonic event by implosion.

A portable case 48 is positioned at the well head. Case 48 contains an amplifier and filter 50, a timer 52 and a chart recorder 54 in one section. In another section of the portable case 48 is a computer 56 and a cooperating high resolution display screen 58. The electronic output of the microphone 60 is provided to the case through signal wires 62. The output of transducer 36 and thermistor 38 are provided to the case by signal wires 64. Signal wires 66 lead from the case 38 to the solenoid 46 to provide power to activate the solenoid. The entire apparatus is powered by a battery, preferably a 12 volt DC battery of the type used in automobiles and recreational vehicles.

With reference now to FIG. 2, the basic operation of the assembly 32 will be explained. A body 70 is threaded to be received in a connector at the well head. A passage 72 is formed through the body. A threaded port 74 receives the pressure transducer 36 to monitor the gas pressure within the passage. Microphone 60 is mounted on the body and exposed to the passage 72. A bleed valve 76 is also mounted on the body to permit the gas pressure within the passage to be bled off when removing the assembly 32 from the well head.

Secured to body 70 is a member 78. Member 78 mounts a gas valve 80 which is normally urged to a closed position by a valve spring 82. When open, the gas valve 80 permits gas flow between the passage 72 and volume chamber 42, defined by member 78 and connector 84. Connector 84 has a gas supply port 86 which connects to gas supply 40 to operate the assembly when well bore pressure is too low. A flow restrictor 88 is integral with the port to limit the rate of flow between the volume chamber and gas supply.

The volume chamber 42 communicates with a chamber 90 on the back side of gas valve 80 through an orifice 92. The solenoid 46 operates the assembly by selectively venting chamber 90 to atmospheric pressure, or isolating it from the atmosphere. As illustrated, the solenoid includes a coil housing 94 containing a movable plunger 96 and sealing pin 98. A spring 100 normally forces the plunger and pin against a valve seat 102 to isolate the chamber 90 from atmosphere. However, activation of the solenoid electrically drives the plunger and pin upward away from the seat to open a connection between the chamber 90 and atmosphere.

When pressurized gas is employed from the gas supply 40, the gas will flow into the volume chamber 42 through restrictor 88 and into chamber 90 through orifice 92. The higher gas supply pressure acting on a rear of the gas valve 80 will supplement the force of valve spring 82 to isolate the volume chamber from passage 72. However, if the solenoid is activated and a path opened from chamber 90 to the atmosphere, the small quantity of pressurized gas within the chamber 90 will bleed to atmosphere rapidly, providing a force imbalance on valve 80 because of the well bore pressure in passage 72, which sharply drives the gas valve to the open position, allowing the high pressure gas in volume chamber 42 to flow into the passage 72 with great velocity, generating a sonic event which travels down the annulus in the well bore.

The assembly 32 can be employed with high well bore pressures by providing a bleed valve from the volume chamber 42 to atmosphere to maintain the pressure in the volume chamber 42 at a predetermined level below the pressure of the well bore and by connecting the chamber 90 to the passage 72 by interchanging the connections of volume chamber 84 and body 70 to member 78. Then, wellbore pressure tends to close gas valve 80 through restriction 92. When solenoid 46 is activated, chamber 90 is bled to atmosphere, which causes gas valve 80 to open rapidly. The escape of wellbore gas to the volume chamber 42 causes a sonic pulse.

Figure 5:
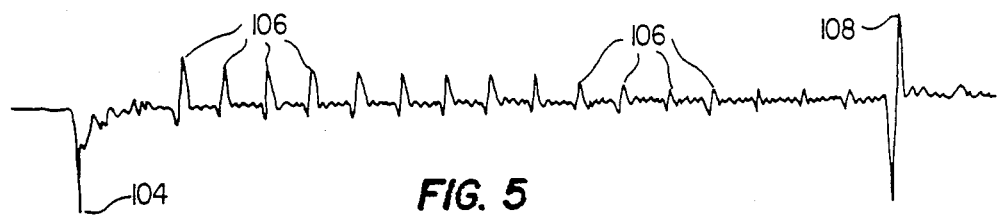
FIG. 5 is a sample trace of the sonic energy reflected as sensed and conditioned by the apparatus.

The assembly 32 is capable of generating the sonic event in the well bore and receiving the reflected sonic energy from down hole objects, such as the well bore collars, and the fluid surface. FIG. 5 is an illustration of a typical signal trace which initiated with the activation of the gun at point 104, and is followed by sensing of the primary reflection of the sonic event from each collar in the well bore, represented by points 106, and the reflection from the fluid surface, represented by point 108. By knowing the number of collars in the bore hole, their depth and separation, the represented trace signal of FIG. 5 allows determination of the liquid level depth. The timer circuit determines the acoustic round trip travel time. Knowing the depth and travel time permits calculation of the speed of sound in the medium, usually gas, between the fluid surface and the well head. Knowing the speed of sound in the gas above the fluid surface permits a direct calculation of the depth of the fluid surface at intermediate times by simply multiplying the interpolated speed of sound by the round trip travel time for the sonic energy starting at the sonic event of point 104, reflecting off the fluid surface and returning up the well bore to be sensed by the microphone, divided by 2.

As illustrated in FIG. 5, the signal representing the sonic energy reflected from the fluid surface ordinarily has a far greater amplitude than any other sonic reflections in the bore hole close in time. Thus, the fluid level could be determined by muting the other signals and simply measuring the travel time for the sonic energy reflecting from a fluid surface if the speed of sound in the overlying gas was constant. However, the speed of sound in the gas varies over the time period required to make an effective pressure build up test. The pressure of the gas, as well as its temperature and composition, have significant effects on the speed of sound through the gas. The present invention, as embodied in apparatus 10, provides an effective compromise by regularly taking traces of the type shown in FIG. 5, which permit instantaneous calculation of the speed of sound in the overlying gas, with continuous sampling of the round trip time for sonic reflection off the fluid surface. This provides an accurate representation of the variation of the speed of sound over the time interval of the test. With that information, an accurate analysis of the variation in fluid level over the test can be made and a bottom hole pressure chart can be generated, such as illustrated in FIG. 6.

Figure 4:
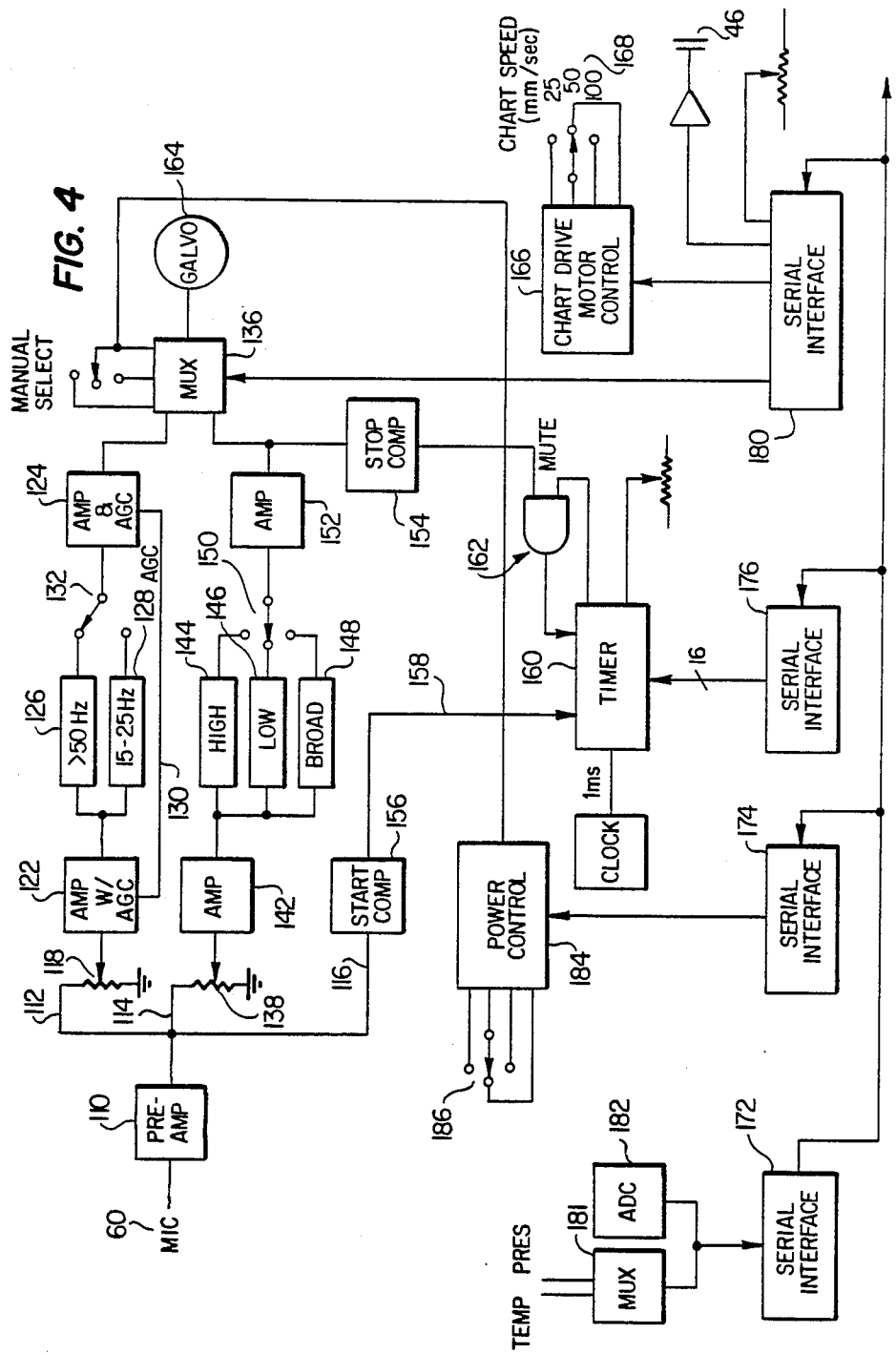
FIG. 4 is a schematic of the electronic circuitry used within the apparatus of FIG. 3.
Figure 7:
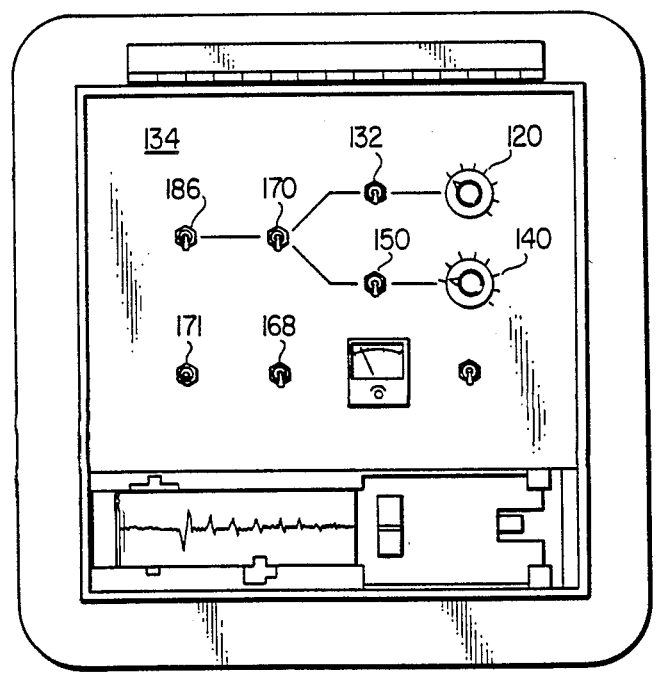
FIG. 7 is an illustrative view of the control panel of the apparatus.

With reference now to FIGS. 4 and 7, the information processing operations within apparatus 10 will be described. The signal from microphone 60 is provided to a pre-amplifier 110. Pre-amplifier 110 is preferably a fixed gain amplifier with a gain of about 2. The output of the pre-amplifier is divided in three channels, 112, 114 and 116. Channel 112 has a attenuator 118 controlled by sensitivity knob 120 on the instrument panel 134 of the case 48, as seen in FIG. 7. From attenuator 118, the channel 112 continues on through two amplifiers 122 and 124 connected through an upper collar or high pass filter 126 and a deep collar or band pass filter 128. The amplifiers 122 and 124 have automatic gain control as represented by feed back line 130. Upper collar filter 126 preferably passes all signals above about 50 Hertz, which provides sharper demarcation for reflections from the upper collars in the well bore. The deep collar filter 128 preferably is a band pass filter which passes signals between about 15 to 25 Hertz, which enhances demarcation of signals reflected from deeper collars within the well bore. Switch 132 on the panel 134 allows selection of the particular filter most useful in a given application. The output of the amplifier 124 is supplied to a multiplexer 136.

The channel 114 includes a attenuator 138 which is controlled by a sensitivity knob 140 on the panel 134. From the attenuator, the channel continues to fixed gain amplifier 142 that drives a high band filter 144, low band filter 146, and a broad band filter 148. A switch 150 on panel 134 selects one of the filters to be connected to a second stage amplifier 152. The high pass filter 144 is used when there is excessive down hole noise created by gas liberation from the fluid. The low band filter 146 is particularly appropriate in special applications, as when mechanical vibrations at the well head are present, and when obstructions, such as a lining top, tubing anchor, paraffin, or tubing perforations are present above the fluid level. In the absence of these special conditions, the broad band filter 148 is preferred. The output of second stage amplifier 152 is also provided to the multiplexer 136. A sample of the analog signal from amplifier 152 is taken off to an analog stop comparator 154.

The third channel 116 takes the amplified signal from pre-amplifier 110 into a start analog comparator 156. The start analog comparator 156 reacts to the initial sonic event of the firing of the gun as sensed by the microphone to trigger off a fixed voltage signal along line 158, which is independent of any gain settings, to open a gate on timer 160. Thus, the timer 160 begins timing at virtually the same instant that the gun generates the originating acoustic event. The timer is stopped when the stop comparator 154 is activated by a large signal output from amplifier 152, such as that representing the sonic reflection from the fluid surface. A mute circuit 162 is provided to prevent the timer from stopping until a predetermined mute time passes after the initial sonic event. Because the channel 114 has no automatic gain control, the output of amplifier 152 accurately reproduces the attenuation of signal strength for the deeper collars in the well bore. The excellent reflectivity of the fluid surface will ensure that the reflected signal from that surface is significantly greater in amplitude than the reflective signals from adjacent collars, as seen in FIG. 5. The mute time is set to prevent a premature stoppage of the timer by reflections from collars near the surface and downhole anomalies, such as tubing anchors and upper perforations, and ensures that the timer accurately measures only the round trip time for the sonic energy reflected from the fluid surface.

The output of the multiplexer 136 is provided to a galvanometer 164 which drives the recording pen on recorder 54 to record, when connected with channel 112, a complete chart of the reflections from the collars, fluid surface and other sonic energy reflectors in the well bore. When the multiplexer connects channel 114 to the galvanometer, the chart recorder will record the signals which are used to stop the timer. By observing the chart, the operator can select the filter which best accents the liquid level response. Also, the sensitivity setting can be adjusted to optimize signal strength. The timer is stopped anytime after mute time that the pen travels one-half of the distance to the edge of the chart. Since the amplifier and filter response can be observed, the optimum selection of filters and adjustment of sensitivity control can be made. Of course, as the computer 56 has a high resolution screen 58, the signals can be displayed on the screen and analyzed in the same manner as the chart. The signals can also be recorded in computer memory for recall at a later time. A chart drive speed control 166, having speed selected by chart speed selection 168, is employed to move the chart at a constant rate, representing the time axis, for recording of the shot pattern by the chart pen. FIG. 5 is an example of a trace such as would be recorded by the apparatus 10 through channel 112.

The apparatus 10 can be operated manually using either channel 112 or 114 by switching on the amplifiers with switch 186 and generating a sonic event by pushing switch 171. When mode selector 170 is in the collar position, the multiplexer transfers the signal from channel 112 to the chart recorder. In the timer position, the multiplexer records the signal from channel 114 on the chart recorder. However, preferably, the selector is placed in the auto position, with computer 56 determining the frequency and timing of the sonic events and the mode of recording in accordance with a preprogrammed sequence.

The computer interacts with the other circuitry in the apparatus through the communication port output on the computer, represented by the series of communication interfaces 172, 174, 176 and 180. While a number of communication interfaces are illustrated, there is typically just one communication port used on the computer and the operation of the amplifier recorder circuitry is achieved through the use of addressable UART (universal asyncronus receiver transmitter) circuitry. Basically, the computer will send out an address and a command targeted to and recognized by only one of the communication interface functions.

The serial inter-face 172 transfers data sensed by the pressure transducer 36 and thermistor 38 through multiplexer 181 and is converted to digital signals through an A-D converter 182. The serial interface 174 provides control of the amplifier power through a power control 184 connected to the battery. A selector switch 186 permits manual activation of the amplifier circuits when desired.

The serial interface 176 interacts with the timer 160. The timer 160 is a bi-directional counter that loads a time value in milliseconds which corresponds to the mute time. The mute time is determined experimentally by taking one or more timer chart traces to determine a time interval where the attenuating collar reflections and any other anomalies have attenuated to the point where the reflections are of low amplitude and the signals are below the required value to stop the control circuit. Upon receiving the start signal, the timer begins down counting and counts out the mute time. When the carry pulse comes out of the timer indicating the timer has a count of zero, the counter reverses and enables the stop comparator 156, counting up until the stop signal is received. The computer can read the contents of the count register, add that to the value of the preprogrammed mute time and thereby have the total round trip travel time for the shot.

The final serial interface 180 controls various aspects, including activation of the solenoid 46 to generate the initial sonic event, activation of the chart drive within the chart recorder and the state of multiplexer 136 determining whether the collar or timer chart trace is recorded on the chart.

The software in the computer determines the sequencing of data points. For collar drive traces, the computer will activate the chart recorder. For other data points, all that is measured is the round trip travel time, which can be recorded in computer memory, without the need for recording on a chart. A collar chart trace could be taken in whatever relationship to a travel time data point desired. For example, a collar chart trace could be created every ten or twenty travel time data points. The computer can also be programmed to count the number of joints to the liquid level automatically, thus permitting the liquid level depth to be determined without operator assistance. In one apparatus constructed in accordance with the teachings of the present invention, a Toshiba T1100 Plus computer was employed, and the UART circuitry was a Motorola MC14469.

The data points will be typically taken on a log cycle time basis for pressure transient testing. However, the software can be set up to take data points per unit time for special production applications. Because the computer has an integral high resolution graphic screen, the computer can analyze and display the data on diagnostic plots, such as illustrated in FIG. 6. The plots calculated can be viewed while the test is in progress, which allows the well to be returned to production as soon as semi-steady state conditions are reached.

While the apparatus is particularly adapted for pressure transient analysis, the apparatus can be used in other situations. For example, a plot of liquid level versus time could be used for valuation for gaseous liquid columns. This can be done in a producing well where a constant liquid level depth is obtained with a given casing pressure. After stabilization, a back pressure valve can be used in the casing to depress the liquid level by increasing pressure within the casing. The apparatus will monitor the casing pressure and the liquid level until the variables have stabilized. With this information, the gradient of the gaseous column can be determined, which is useful for measuring well properties and reservoir properties.

Also, gas lift operations can be monitored to analyze the unloading process. Safer drilling operations are possible by keeping track of the mud level in the well bore.

The apparatus can also be used on injections wells. During injection, the surface pressure can be measured. When the well is shut in, pressure fall off data can be obtained in order to determine the reservoir characteristics.

The apparatus can also be used to monitor the liquid level in the annulus of a drilling well or a well in which a work over is occurring. The mud level (or water level) in the casing annulus must be maintained at a sufficient height to prevent reservoir fluid blow out. The apparatus can be used to monitor the distance from the surface to the top of the liquid level to ensure that a sufficient height of liquid column above the formation is maintained to prevent blow out.

In summary, the apparatus and method of the present invention allows a determination of the liquid level depth by recording an acoustic strip chart automatically, from which the liquid level depth can be obtained by counting the number of tubing collars to the liquid level. Simultaneously, the acoustic round trip travel time of the pressure pulse from the acoustic gas gun to the liquid level and back to the microphone is measured and recorded. Input of liquid level depth from the strip chart by reference to the tubing collars allows the computer and software to determine acoustic velocity. Subsequent liquid level depths are determined by simply measuring round trip travel time and having the computer calculate the depth by utilizing acoustic velocity.

The acoustic velocity of the gas does change and periodically another acoustic strip chart of the collar response is obtained by the apparatus. The liquid level depth and the measured round trip travel time are entered to permit another acoustic velocity measurement. Intermediate acoustic round trip travel time shot points are utilized with interpolated acoustic velocity data from the strip charts to calculate the liquid level depths at these intermediate test times. Literally hundreds of instantaneous liquid level depth measurements can be taken at these intermediate test times with a high degree of accuracy by allowing correction for acoustic velocity changes. Where previously laborious and time consuming field testing and calculations were required, and prevented satisfactory evaluation of the data, the computer and the apparatus performs these functions in a timely and convenient manner.

Although a single embodiment of the invention has been illustrated in the accompanying drawings and described in the foregoing Detailed Description, it will be understood that the invention is not limited to the embodiment disclosed, but is capable of numerous rearrangements, modifications and substitutions of parts and elements without departing from the spirit of the invention.

I claim:

1. An apparatus for measuring variations of the fluid level depth within a well bore over a time period, the apparatus including means for generating a sonic event in the well bore and means for sensing sonic energy reflected from down hole sonic reflectors, including tubing collars and the fluid surface, comprising:

first means for activating said sonic generating means and sonic sensing means for determining the fluid level depth by relating the sonic energy reflected from the fluid surface to sonic energy reflected from other sonic energy reflectors at known depth, and for calculating the sonic velocity in the gas overlying the fluid level;

second means for activating the sonic generator means and sonic energy sensing means to measure the travel time for the sonic energy to travel from the sonic generating means, reflect off the fluid surface and return to the sonic sensing means for determining the fluid level using the sonic velocity calculated by said first means and muting the sonic energy signals from sonic reflectors other than the fluid level in the well bore to isolate the travel time; and said first and second means further for activating said sonic generating means and sonic sensing means automatically at preselected time during the time period without requiring the attention of an operator.

2. The apparatus of claim 1 wherein the first means determines the fluid level and calculates the sonic velocity at regular intervals during the time period and the sonic means measures the travel time at regular intervals between measurements by said first means, the sonic velocity for each measurement of travel time by said second means being interpolated between actual sonic velocities calculated by said first means.

3. The apparatus of claim 1 further having automatic gain control for sonic energy reflections sensed by said first means.

4. The apparatus of claim 1 wherein said first means includes a high pass filter for enhancing reflection signals from upper collars in the well bore and a medium pass filter for enhancing sensing of reflections from deep collars within the well bore.

5. The apparatus of claim 1 wherein said second means includes a high pass filter for enhancing sensing of the reflection of sonic energy from the fluid surface when down hole gas liberation causes excessive noise, a low pass filter for excessive mechanical vibrations of the well head, and a broad band filter.

6. The apparatus of claim 1 further having display means for displaying fluid depth as a function of time over the test interval.

7. The method of measuring the variation of the fluid level within a well bore over a predetermined time period, including the steps of:

generating a sonic event in the well bore at predetermined times during the time period and sensing sonic energy reflections from down hole sonic reflectors, including tubing collars and the fluid surface;

recording the sonic energy reflections sensed at selected sonic events for all sonic reflectors and computing the fluid surface depth and sonic velocity of the gas overlying the fluid surface by relating the known depth of sonic reflectors including tubing collars to provide continuing data s to the variation of the sonic velocity during the time period of the test;

measure the travel time of the sound energy reflected by the fluid surface for each sonic event between the events used to calculate the sonic velocity and interpolating the sonic velocity to calculate the fluid depth at each sonic event, said step including the step of muting sonic energy reflection sensed for a predetermined time period after the sonic event to isolate the reflection from the fluid surface; and selecting the predetermined time intervals at the beginning of the time period for entry into a control means for controlling the steps of generating, recording and measuring without the attendance of an operator during the time period.

* * * * *